(12) United States Patent
Jo et al.

(10) Patent No.: US 11,384,752 B2
(45) Date of Patent: Jul. 12, 2022

(54) AGRICULTURAL WORK VEHICLE HAVING AIR SUPPLY DEVICE

(71) Applicant: LS MTRON LTD., Anyang-si (KR)

(72) Inventors: Jun Yeon Jo, Anyang-si (KR); Haeng Sik Yang, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 106 days.

(21) Appl. No.: 16/969,390

(22) PCT Filed: Dec. 14, 2018

(86) PCT No.: PCT/KR2018/015892
§ 371 (c)(1),
(2) Date: Aug. 12, 2020

(87) PCT Pub. No.: WO2019/160230
PCT Pub. Date: Aug. 22, 2019

(65) Prior Publication Data
US 2020/0400137 A1     Dec. 24, 2020

(30) Foreign Application Priority Data

Feb. 13, 2018  (KR) .................. 10-2018-0017635
Dec. 4, 2018   (KR) .................. 10-2018-0154407

(51) Int. Cl.
*F04B 49/02*     (2006.01)
*B60T 17/02*     (2006.01)
(Continued)

(52) U.S. Cl.
CPC .......... *F04B 49/022* (2013.01); *B60T 13/268* (2013.01); *B60T 17/02* (2013.01);
(Continued)

(58) Field of Classification Search
CPC ........ F04B 49/022; F04B 49/22; F04B 41/02; F04B 2205/063; F04B 2207/02; B60T 13/268; B60T 17/02
See application file for complete search history.

(56) References Cited

U.S. PATENT DOCUMENTS 5,114,315 A * 5/1992 Kaltenthaler .......... F04C 28/06
                                                         417/18
5,592,754 A   1/1997 Krieder et al.
(Continued)

FOREIGN PATENT DOCUMENTS

CN  101132960 A   2/2008
CN  104595161 A   5/2015
(Continued)

OTHER PUBLICATIONS

Chinese Office Action for related Chinese Application No. 201880003280.8; action dated Apr. 30, 2021; (6 pages).
(Continued)

*Primary Examiner* — Christopher S Bobish
(74) *Attorney, Agent, or Firm* — K&L Gates LLP

(57) ABSTRACT

An agricultural work vehicle having an air supply device includes: an air compressor for pressurizing air; an air tank for storing the air compressed by means of the air compressor; a pressure sensor for measuring the pressure of the air stored in the air tank or atmospheric pressure; a controller for stopping the operation of the air compressor when the measured pressure exceeds a first reference value; and an air pressure regulator for discharging, to the outside, the air inside an air pressure circuit system so as to reduce the pressure when the pressure of the air stored in the air tank exceeds a second reference value.

6 Claims, 6 Drawing Sheets

(51) Int. Cl.
*F04B 49/22* (2006.01)
*F04B 41/02* (2006.01)
*B60T 13/26* (2006.01)

(52) U.S. Cl.
CPC .............. *F04B 41/02* (2013.01); *F04B 49/22* (2013.01); *F04B 2205/063* (2013.01); *F04B 2207/02* (2013.01)

(56) References Cited

U.S. PATENT DOCUMENTS

| | | | | |
|---|---|---|---|---|
| 7,632,076 | B2* | 12/2009 | Seitz | ........................ B60T 17/02 417/364 |
| 7,784,879 | B2 | 8/2010 | Koelzer | |
| 8,529,660 | B2 | 9/2013 | Diekmeyer et al. | |
| 9,062,671 | B2* | 6/2015 | Schmid | ................... B60T 17/02 |
| 9,783,019 | B2 | 10/2017 | Diekmeyer et al. | |
| 11,156,213 | B2* | 10/2021 | Young | ..................... F04B 23/02 |
| 2003/0219346 | A1* | 11/2003 | Abe | ........................ F04B 53/16 417/540 |
| 2004/0012249 | A1 | 1/2004 | Koelzer | |
| 2008/0069703 | A1* | 3/2008 | Beckman | ................ F04B 49/20 417/307 |
| 2013/0236331 | A1* | 9/2013 | Hutchinson | ........... F04B 49/065 417/22 |
| 2013/0294937 | A1* | 11/2013 | Worden | .................. F04B 51/00 417/63 |
| 2014/0056731 | A1* | 2/2014 | Marica | ...................... F04B 5/00 417/279 |
| 2021/0079904 | A1* | 3/2021 | Nemeth | ................ F04B 49/022 |

FOREIGN PATENT DOCUMENTS

| | | |
|---|---|---|
| CN | 105649967 A | 6/2016 |
| CN | 106696937 A | 5/2017 |
| JP | 2010-540352 A | 12/2010 |
| JP | 2012-508143 A | 4/2012 |
| JP | 2012-530641 A | 12/2012 |
| KR | 10-2005-0037554 A | 4/2005 |
| KR | 10-2014-0078172 A | 6/2014 |
| KR | 20160080942 A | 7/2016 |
| WO | WO 2009046779 A1 | 4/2009 |

OTHER PUBLICATIONS

International Search Report for related International Application No. PCT/KR2018/015892; report dated Mar. 12, 2019; (2 pages).
Written Opinion for related International Application No. PCT/KR2018/015892; report dated Mar. 12, 2019; (4 pages).
Chinese Notice of Allowance for related Chinese Application No. 201880003280.8; action dated Apr. 19, 2022; (7 pages).

* cited by examiner

AGRICULTURAL WORK VEHICLE HAVING AIR SUPPLY DEVICE

CROSS REFERENCE TO RELATED APPLICATIONS

The present application is a National Stage of International Application No. PCT/KR2018/015892 filed on Dec. 14, 2018, which claims priority to the benefit of Korean Patent Application No. 10-2018-0017635 filed on Feb. 13, 2018 and Korean Patent Application No. 10-2018-0154407 filed on Dec. 4, 2018 with the Korean Intellectual Property Office, the entire contents of each hereby incorporated by reference.

FIELD OF TECHNOLOGY

The present disclosure relates to an agricultural work vehicle having an air supply device, and more particularly, to an agricultural work vehicle having an air supply device, in which whether to operate an air compressor is controlled by measuring a pressure of stored air when compressing and storing the air into an air tank in order to perform air braking on a trailer attached to a rear side of the agricultural work vehicle or to operate an air gun used to clean the vehicle, thereby minimizing a loss of power caused by operating the air compressor at all times.

BACKGROUND

In general, as illustrated in FIG. 1, an agricultural work vehicle 1 such as a tractor travels by using power of an engine 2. Further, a trailer 5 may be mounted at a rear side of the agricultural work vehicle 1 such as a tractor. Therefore, the trailer 5 is a vehicle to be towed and moved by being pulled by power of the agricultural work vehicle 1 such as a tractor.

When the agricultural work vehicle 1 such as a tractor travels in a state in which the trailer 5 is mounted as described above, the trailer 5 may travel using the power from the agricultural work vehicle 1 such as a tractor, and when the tractor is braked, the trailer 5 needs to be also braked at the same time. In particular, because acceleration is increased as a weight of the trailer 5 and weights of articles loaded onto the trailer 5 are increased, there may be a case in which the trailer 5 cannot be braked only by braking force for the tractor, which may cause a risk of accidents such as a rear-end collision.

Therefore, in a case in which the trailer 5 is mounted at the rear side of the agricultural work vehicle 1 such as a tractor, the trailer 5 needs to be configured such that the trailer 5 is also braked by transmitting air pressure or oil pressure to the trailer 5 or connecting the trailer 5 with a mechanical link structure or the like when braking the trailer 5, and this is an essential factor for safety regulated by various international standards.

In particular, an air braking system is one of the systems mostly used among various types of systems for braking the trailer 5, and the air braking system brakes the trailer 5 by transmitting air pressure to the trailer 5 when braking the agricultural work vehicle 1 such as a tractor.

In this regard, Korean Patent Application Laid-Open No. 10-2016-0080942 discloses an air braking system mounted on the agricultural work vehicle 1 such as a tractor. That is, as illustrated in FIG. 2, a brake pedal 110, which is manipulated by a driver's foot, is typically positioned in a cabin of the agricultural work vehicle 1 such as a tractor. When the driver presses the brake pedal 110, a hydraulic cylinder 120 connected to the brake pedal 110 operates, such that the braking is performed by a hydraulic braking system of the agricultural work vehicle 1 such as a tractor. In this case, the air braking system for the trailer 5 also operates together with the operation of the hydraulic braking system of the agricultural work vehicle 1 such as a tractor, such that the trailer 5 is also braked.

More specifically, the air braking system includes an air compressor 151 configured to compress the air, an air pressure regulator 152 configured to prevent a pressure of the air from being excessively raised, an air tank 153 configured to store the compressed air, an air braking valve 154 mounted on the brake pedal 110, and connectors 155 connected to the air braking valve 154 and connected to an air line of the trailer 5, and a pressure indicator 156 is mounted on the air tank 153 to indicate the pressure of the stored air.

In this case, when the driver manipulates the brake pedal 110, the hydraulic cylinder 120 operates, the hydraulic braking system of the agricultural work vehicle 1 such as a tractor operates, and the air braking valve 154 operates, such that the compressed air, which is compressed by the air compressor 151 and stored in the air tank 153, is supplied to the connector 155 through the air braking valve 154. Therefore, the compressed air is introduced, via the air line of the trailer 5, through the connector 155 connected to the air line of the trailer 5, thereby braking the trailer 5.

However, in the air braking system in the related art, the air compressor 151 operates at all times because the air used for the braking needs to be compressed at a predetermined pressure or higher and stored at all times. In this case, the air compressor 151 uses a part of the power from the engine 2 at all times because the air compressor 151 uses the power which is transmitted from the engine 2 through a belt-pulley or gear-engagement structure of the engine 2. As a result, there is a problem in that a loss of power may occur at all times, and the power, which needs to be used for an operation of towing a working machine or transmitting power from a PTO, may be unnecessarily consumed.

The present disclosure has been made in an effort to solve the above-mentioned problems, and an object of the present disclosure is to provide an agricultural work vehicle having an air supply device capable of preventing a loss of power caused by operating an air compressor at all times in order to compress and store air into an air tank, and preventing the operational performance from deteriorating due to a lack of power caused by unnecessary consumption of power.

The detailed objects of the present disclosure will be apparently identified and understood by experts or researchers in this technical field through the specific description disclosed below.

SUMMARY

In order to achieve the above-mentioned object, an agricultural work vehicle 1 having an air supply device 200 according to an exemplary embodiment of the present disclosure includes: an air compressor 210 configured to compress air; an air tank 230 configured to store the air compressed by the air compressor 210; a pressure sensor 250 configured to measure a pressure of the air stored in the air tank 230 or measure atmospheric pressure; a controller 260 configured to stop an operation of the air compressor 210 when the measured pressure exceeds a first reference value; and an air pressure regulator 220 configured to decompress the air in an air pressure circuit system by discharging the air to the outside when the pressure of the air stored in the air tank 230 exceeds a second reference value, in which the air pressure regulator 220 includes a decompression valve 226 configured to reduce a pressure in the air pressure circuit system, the air pressure regulator 220 has a measurement line 221 configured to measure the pressure of the air stored in the air tank 230 or measure the atmospheric pressure, and the measurement line 221 is provided at a point of the decompression valve 226 at which the pressure of the air stored in the air tank 230 is measured.

In this case, the air pressure regulator 220 may include a pressure control valve 222, and the pressure control valve 222 may change connection paths based on the pressure of the air stored in the air tank 230, thereby enabling the pressure sensor 250 to measure the pressure of the air stored in the air tank 230 or measure the atmospheric pressure.

In addition, the pressure sensor 250 may be connected to the measurement line 221 to measure the pressure of the air transmitted through the pressure control valve 222.

In this case, the air compressor 210 may have an electrically-controlled clutch controlled based on an electrical signal, and whether to operate the air compressor 210 may be controlled based on an electrical control signal of the controller 260.

In addition, when an engine 2 of the agricultural work vehicle 1 operates, the air compressor 210 may operate, and pressures, which are measured by the pressure sensor 250 at time intervals, may be compared with the first reference value, in which the air compressor 210 may be stopped when the measured pressure exceeds the first reference value, and the air compressor 210 may operate when the measured pressure does not reach the first reference value.

In addition, the decompression valve 226 may reduce a pressure in the air pressure circuit system by connecting the air pressure circuit system to a discharge line 225 based on the pressure of the compressed air compressed by the air compressor 210 and on the pressure in the air tank 230 transmitted through a signal line 224.

In addition, the pressure control valve 222 may connect the signal line 224 and a supply line 223 based on the pressure in the air tank 230 to transmit the pressure in the air tank 230 to the signal line 224, or the pressure control valve 222 may connect the signal line 224 and a drain line 222a to transmit the atmospheric pressure to the signal line 224.

According to the agricultural work vehicle 1 having the air supply device 200 according to the exemplary embodiment of the present disclosure, whether to operate the air compressor 210 is controlled by measuring the pressure of the stored air when compressing and storing the air into the air tank 230, thereby preventing a loss of power caused by operating the air compressor 210 at all times, and preventing the operational performance from deteriorating due to a lack of power caused by unnecessary consumption of power.

BRIEF DESCRIPTION OF THE DRAWINGS

The accompanying drawings included as a part of the detailed description for helping to understand the present disclosure provide exemplary embodiments of the present disclosure, and the technical spirit of the present disclosure will be described with reference to the detailed description.

DETAILED DESCRIPTION

Figure 1:
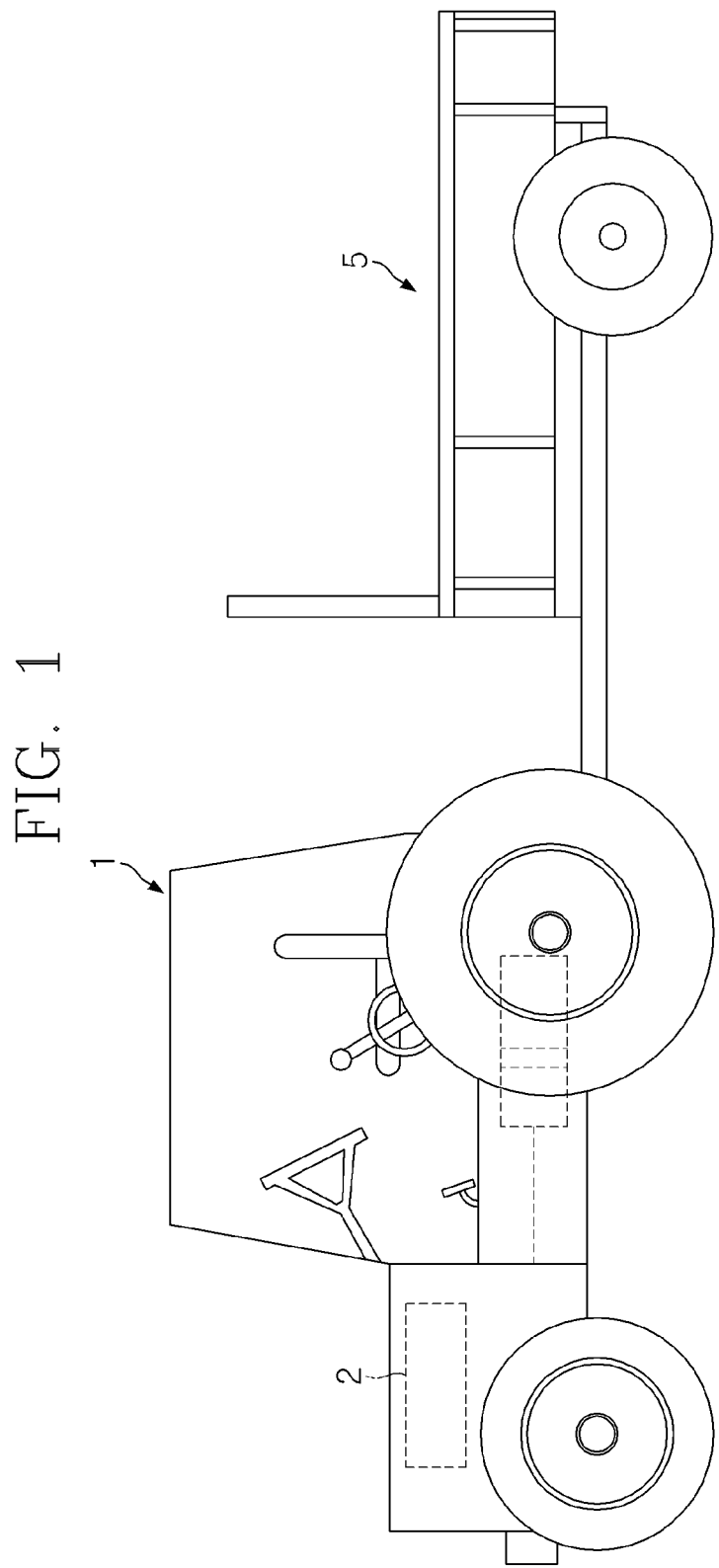
FIG. 1 is an exemplified view of an agricultural work vehicle 1 to which a typical trailer 5 is attached.
Figure 2:
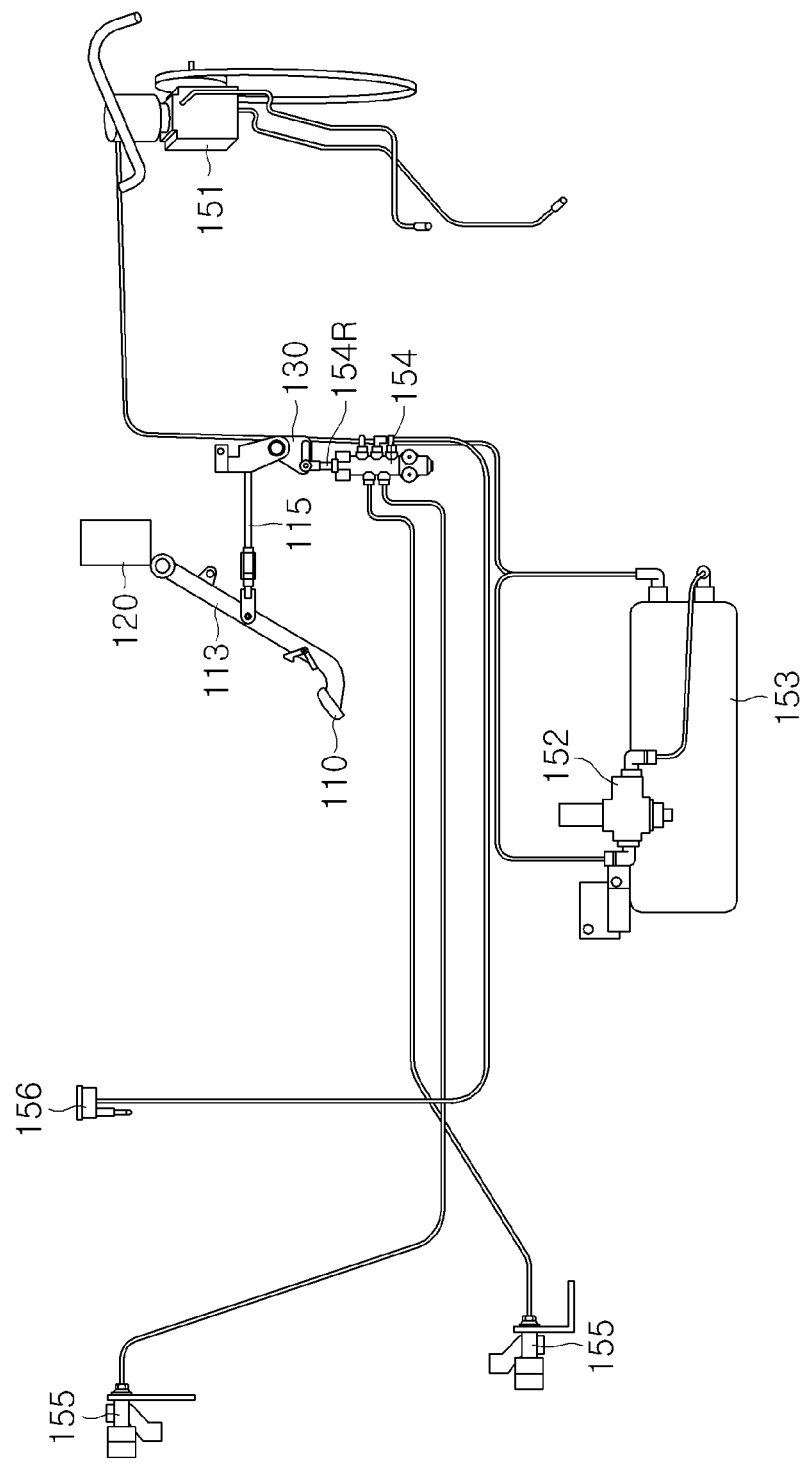
FIG. 2 is an exemplified view of an air supply device 200 of the typical agricultural work vehicle 1.

Hereinafter, exemplary embodiments of the present disclosure will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present disclosure, the specific descriptions of well-known related configurations or functions will be omitted when it is determined that the specific descriptions may obscure the subject matter of the present disclosure. Further, the exemplary embodiments of the present disclosure will be described below, but the technical spirit of the present disclosure is not limited thereto and may of course be carried out by those skilled in the art.

Figure 3:
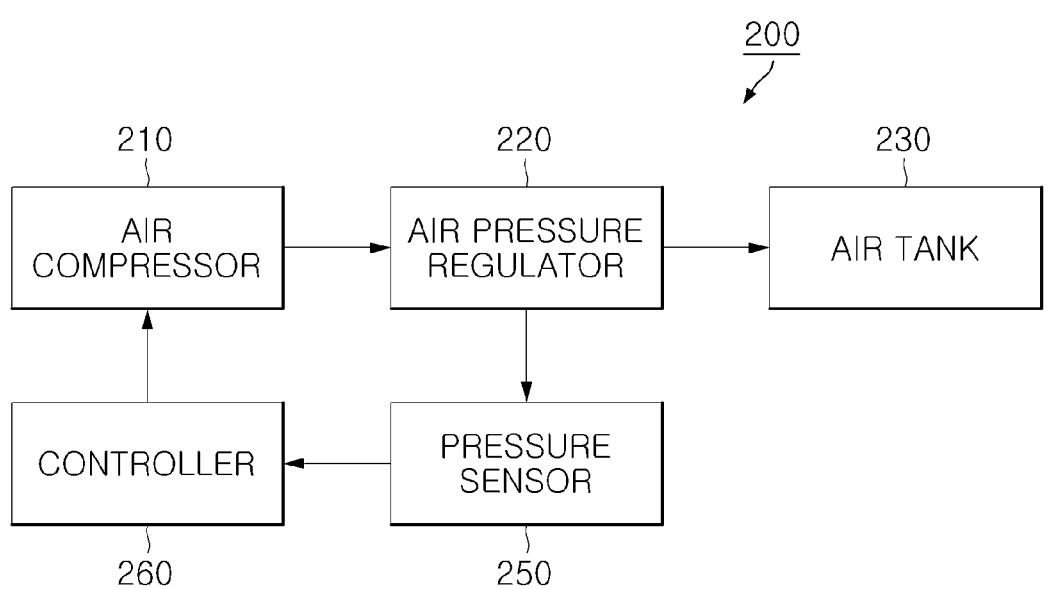
FIG. 3 is a block diagram of the air supply device 200 of the agricultural work vehicle 1 according to an exemplary embodiment of the present disclosure.

FIG. 3 illustrates a block diagram of an air supply device 200 of an agricultural work vehicle 1 according to an exemplary embodiment of the present disclosure. As illustrated in FIG. 3, the air supply device 200 of the agricultural work vehicle 1 according to the exemplary embodiment of the present disclosure is an air supply device 200 used to brake a trailer 5 attached to the agricultural work vehicle 1 and may include an air compressor 210 configured to compress air for braking the trailer 5, an air tank 230 configured to store the air compressed by the air compressor 210, a pressure sensor 250 configured to measure a pressure of the air stored in the air tank 230 or measure the atmospheric pressure, and a controller 260 configured to stop an operation of the air compressor 210 when the measured pressure exceeds a first reference value.

In this case, the first reference value may be determined in consideration of pressure required to brake the trailer 5 attached to the agricultural work vehicle 1.

Therefore, the agricultural work vehicle 1 having the air supply device 200 according to the exemplary embodiment of the present disclosure controls whether to operate the air compressor 210 by measuring a pressure of stored air when compressing and storing the air into the air tank 230 in order to perform air braking on the trailer 5 attached to a rear side of the agricultural work vehicle 1 or to operate an air gun used to clean the vehicle, thereby preventing a loss of power caused by operating the air compressor 210 at all times, and preventing the operational performance from deteriorating due to a lack of power caused by unnecessary consumption of power.

In addition, as illustrated in FIG. 3, the air supply device 200 of the agricultural work vehicle 1 according to the exemplary embodiment of the present disclosure may further include an air pressure regulator 220 configured to decompress air in an air pressure circuit system by discharging the air to the outside when a pressure of the air stored in the air tank 230 exceeds a second reference value.

Further, the air pressure regulator 220 may have a measurement line 221 configured to measure the pressure of the air stored in the air tank 230. In this case, the air pressure regulator 220 may include a decompression valve 226 implemented as an unloading valve, a safety valve, or the like. In this case, the measurement line 221 may be provided at a point of the unloading valve of the decompression valve 226 at which the pressure of the air stored in the air tank 230 may be measured. Therefore, the pressure sensor 250 may be connected to the measurement line 221 to measure the pressure of the air stored in the air tank 230. The controller 260 collects data, which are related to the pressure of the air in the air tank 230, from the pressure sensor 250, and stops the operation of the air compressor 210 when the pressure of the air stored in the air tank 230 exceeds the first reference value, thereby effectively preventing a loss of power caused by operating the air compressor 210 at all times.

In addition, the air pressure regulator 220 may include a pressure control valve 222. In this case, the pressure control valve 222 may change connection paths based on the pressure of the air stored in the air tank 230, thereby enabling the pressure sensor 250 to measure the pressure of the air stored in the air tank 230 or measure the atmospheric pressure.

Further, the air compressor 210 of the agricultural work vehicle 1 according to the exemplary embodiment of the present disclosure may have an electrically-controlled clutch (not illustrated) controlled based on an electrical signal, such that whether to operate the air compressor 210 may be controlled by engaging or disengaging the clutch (not illustrated) based on an electrical control signal from the controller 260.

Figure 4:
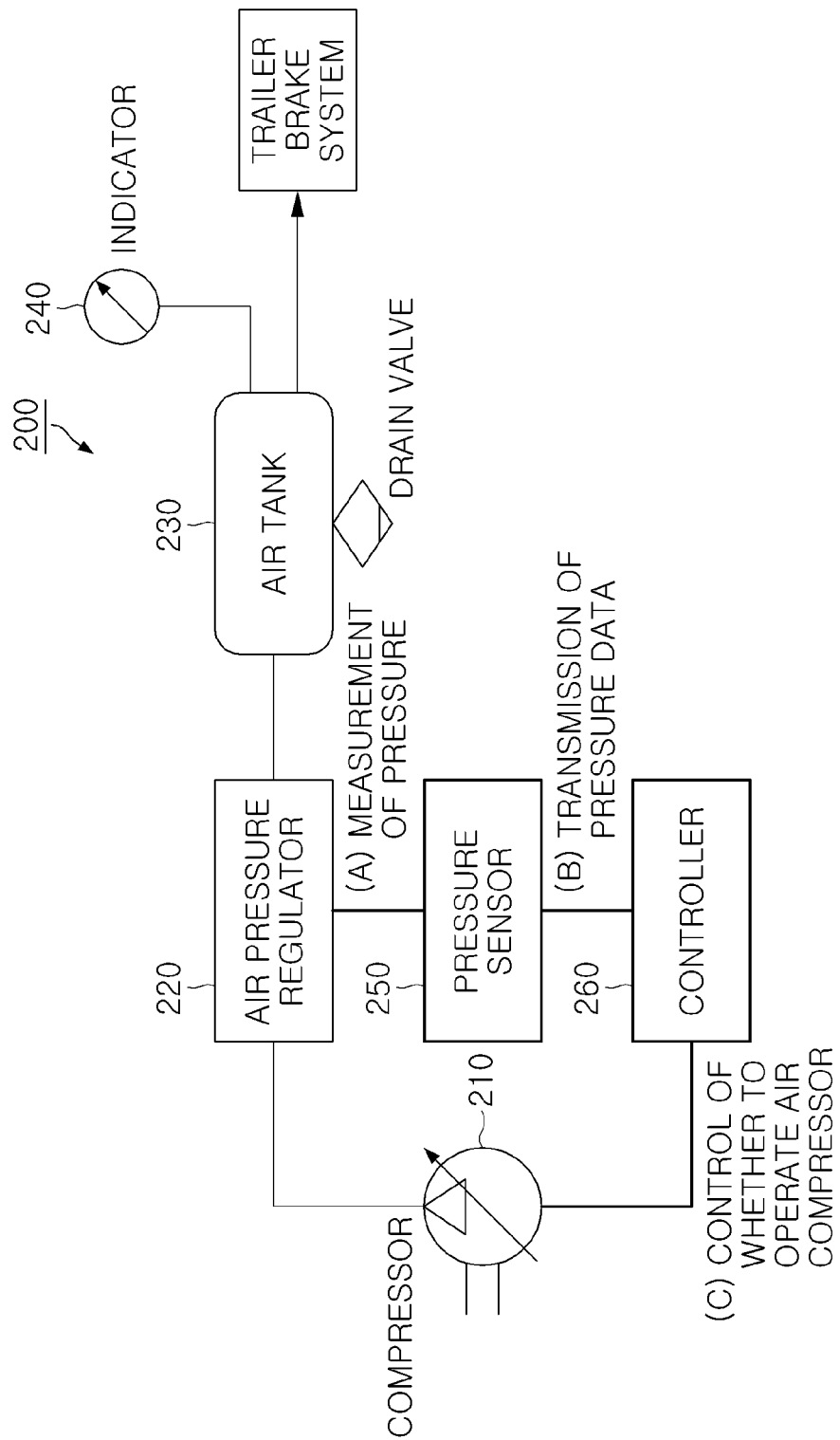
FIG. 4 is a view for explaining a process of operating the air supply device 200 of the agricultural work vehicle 1 according to the exemplary embodiment of the present disclosure.

In addition, FIG. 4 is a view for more specifically explaining the operation of the air supply device 200 of the agricultural work vehicle 1 according to the exemplary embodiment of the present disclosure. Hereinafter, the respective constituent elements of the air supply device 200 of the agricultural work vehicle 1 according to the exemplary embodiment of the present disclosure will be described in more detail with reference to FIG. 4.

First, the air compressor 210 compresses the air for braking the trailer 5 attached to the rear side of the agricultural work vehicle 1, and the air compressed by the air compressor 210 is stored in the air tank 230. In addition, the air tank 230 may have a pressure indicator 240 to indicate the pressure of the air stored in the air tank 230, thereby providing an operator with information about the pressure of the air.

In this case, in the present disclosure, various types of compressors capable of compressing the air, for braking the trailer 5, to an appropriate pressure may be used as the air compressor 210. In addition, in the present disclosure, the air tank 230 may be used without being particularly limited as long as the air tank 230 may appropriately store the air with the pressure required to brake the trailer 5.

In addition, the pressure sensor 250 of the air supply device 200 of the agricultural work vehicle 1 according to the exemplary embodiment of the present disclosure measures the pressure of the air stored in the air tank 230. In this case, in the present disclosure, the pressure sensor 250 may be used without being particularly limited as long as the pressure sensor 250 may measure the pressure of the air that may be stored in the air tank 230 and used to brake the trailer 5.

Further, as illustrated in FIG. 4, the air supply device 200 of the agricultural work vehicle 1 according to the exemplary embodiment of the present disclosure may further include the air pressure regulator 220 configured to decompress the air in the air pressure circuit system by discharging the air to the outside when the pressure of the air stored in the air tank 230 exceeds the second reference value. More specifically, the air pressure regulator 220 may include the decompression valve 226 implemented as an unloading valve or the like. Of course, the present disclosure is not limited thereto, and instead of the unloading valve, the air pressure regulator 220 may include the decompression valve 226 having various structures, such as a safety valve, capable of decompressing the air by discharging the air when the pressure of the air exceeds the reference value.

Therefore, the pressure sensor 250 may be connected to the air pressure regulator 220 including the decompression valve 226 to measure the pressure of the air stored in the air tank 230 (see (A) in FIG. 4).

Next, the pressure sensor 250 transmits the measured pressure data to the controller 260 by means of an electrical signal or the like (see (B) in FIG. 4). More specifically, the pressure sensor 250 may transmit the measured pressure data to the controller 260 in various ways, such as transmitting the measured pressure data in the form of an analog electrical signal or converting the measured pressure data into a digital signal and transmitting the converted digital signal.

Therefore, the controller 260 of the air supply device 200 of the agricultural work vehicle 1 according to the exemplary embodiment of the present disclosure controls the operation of the air compressor 210 based on an electrical control signal when the pressure of the air stored in the air tank 230, which is measured by the pressure sensor 250, exceeds the first reference value (see (C) in FIG. 4).

In this case, the first reference value may be determined in consideration of the pressure required to brake the trailer 5 attached to the agricultural work vehicle 1. More specifically, the first reference value may be determined by adding an appropriate margin to the pressure required to brake the trailer 5. Therefore, the air tank 230 may store and maintain the air with the pressure sufficient for braking the trailer 5, such that the air compressor 210 may be prevented from operating at all times, thereby preventing an unnecessary loss of power.

In addition, more specifically, the controller 260 may be implemented by using an electronic control unit provided in the agricultural work vehicle 1 such as a tractor or may be implemented in various ways such as using a separate electricity circuit.

Therefore, the controller 260 determines whether to operate the air compressor 210 based on the pressure data transmitted from the pressure sensor 250, creates a control signal accordingly, and then controls the operation of the air compressor 210, thereby effectively preventing a loss of power caused by operating the air compressor 210 all times.

Further, the air compressor 210 may include the electrically-controlled clutch (not illustrated) controlled based on an electrical signal. Therefore, the operation of engaging or disengaging the clutch (not illustrated) may be controlled based on the electrical control signal created by the controller 260, such that the controller 260 may control whether to operate the air compressor 210 based on the pressure of the air stored in the air tank 230 which is measured by the pressure sensor 250.

Further, the air pressure regulator 220 of the air supply device 200 of the agricultural work vehicle 1 according to the exemplary embodiment of the present disclosure may include the decompression valve 226 implemented as an unloading valve, a safety valve, or the like, such that it is possible to protect the air tank 230 and the air pressure circuit system by decompressing the air in the air pressure circuit system by discharging the air to the outside when the pressure of the air stored in the air tank 230 exceeds the second reference value. More specifically, in a case in which the air tank 230 may be damaged when the pressure of the air stored in the air tank 230 exceeds 100 bar, the first reference value is set as 90 bar first in the air supply device 200 of the agricultural work vehicle 1 according to the exemplary embodiment of the present disclosure. When the pressure of the air stored in the air tank 230 reaches 90 bar, the controller 260 stops the operation of the air compressor 210, thereby preventing the air from being excessively compressed. However, if the air compressor 210 continuously operates without being stopped due to an error of the controller 260 or the like, the pressure in the air tank 230 will go over 90 bar and reach 100 bar, which causes the air tank 230 to encounter a risk of being damaged. Therefore, in the present disclosure, the second reference value is set as 95 bar, such that when the pressure of the air stored in the air tank 230 reaches 95 bar due to an error of the controller 260 or the like, the decompression valve 226 discharges the air in the air pressure circuit system to the outside, thereby preventing the air tank 230 or the air pressure circuit system from being damaged. In this case, the first reference value and the second reference value may be determined in consideration of operational environments and the like, such that the first reference value and the second reference value may be set and used as values different from each other or as necessary, equal to each other.

Further, the unloading valve or the like of the decompression valve 226 may have the measurement line 221 configured to measure the pressure of the air stored in the air tank 230.

Figure 5:
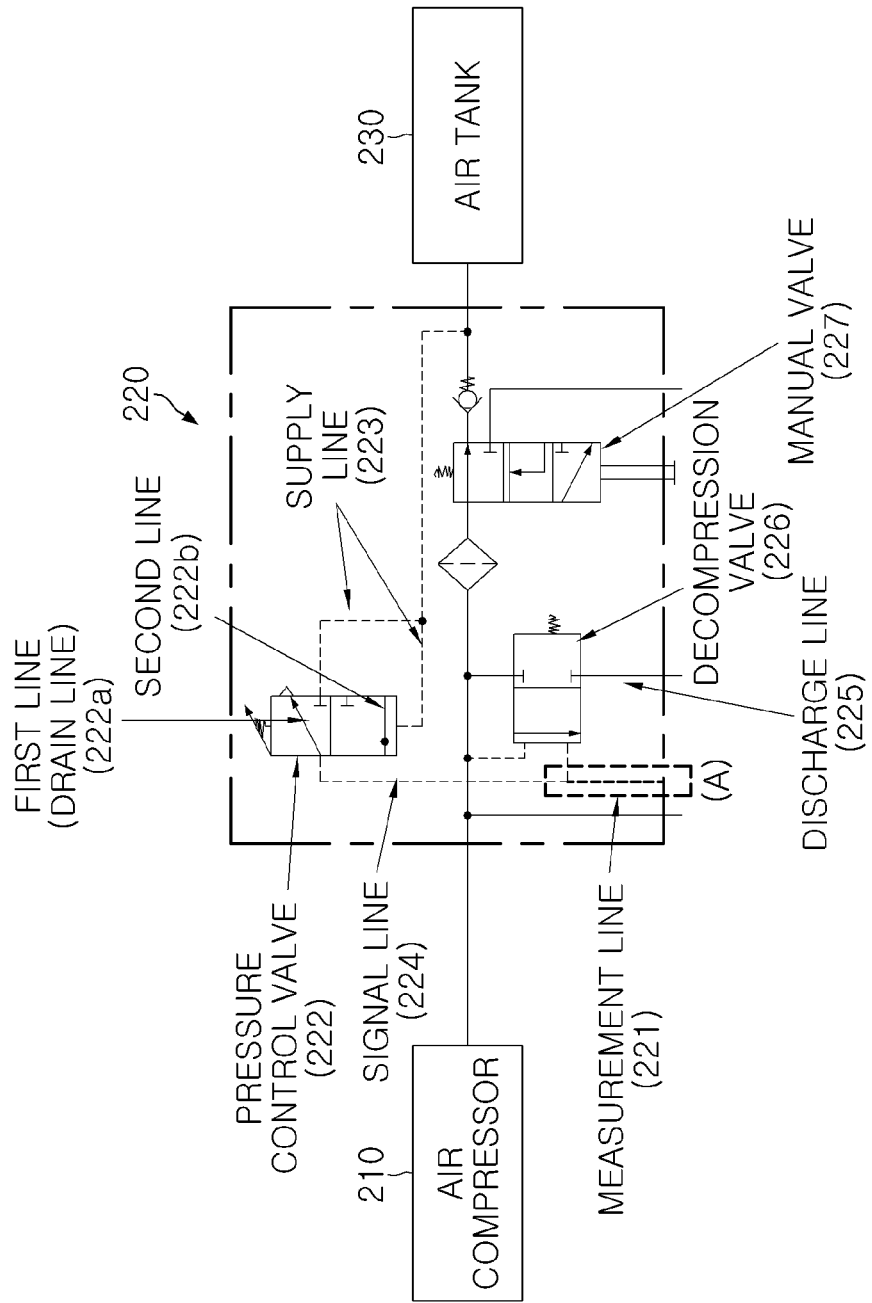
FIG. 5 is a view illustrating a measurement line 221 provided in an air pressure regulator 220 of the air supply device 200 of the agricultural work vehicle 1 according to the exemplary embodiment of the present disclosure.

More specifically, FIG. 5 illustrates a structure of the air pressure regulator 220 in which the measurement line 221 according to the exemplary embodiment of the present disclosure is provided.

As illustrated in FIG. 5, the air pressure regulator 220 of the air supply device 200 provided in the agricultural work vehicle 1 according to the exemplary embodiment of the present disclosure may include the decompression valve 226 configured to reduce the pressure in the air pressure circuit system by connecting the air pressure circuit system to a discharge line 225 based on the pressure of the compressed air compressed by the air compressor 210 and on the pressure in the air tank transmitted through a signal line 224. The air pressure regulator 220 may include a manual valve 227 configured to discharge the pressure in the air pressure circuit system by means of a user's manual manipulation. Therefore, it is possible to prevent the pressure in the air pressure circuit system from being excessively raised.

The measurement line 221 may be provided in the decompression valve 226 (see (A) in FIG. 5), and the measurement line 221 may be provided at a point of the unloading valve or the like of the decompression valve 226 at which the pressure of the air stored in the air tank 230 may be measured. Therefore, the pressure sensor 250 may be connected to the measurement line 221 to measure the pressure of the air stored in the air tank 230 and transmit data, which is related to the pressure of the air in the air tank 230, to the controller 260.

In this case, as illustrated in FIG. 5, the air pressure regulator 220 may include the pressure control valve 222. In this case, the pressure control valve 222 may change connection paths based on the pressure of the air stored in the air tank 230, thereby enabling the pressure sensor 250 to measure the pressure of the air stored in the air tank 230 or measure the atmospheric pressure. That is, the pressure control valve 222 may connect the signal line 224 and a supply line 223 based on the pressure in the air tank 230 to transmit the pressure in the air tank 230 to the signal line 224, or the pressure control valve 222 may connect the signal line 224 and a first line (drain line) 222a to transmit the atmospheric pressure to the signal line 224.

For example, when the pressure of the air stored in the air tank 230 is lower than a third reference value, the first line (drain line) 222a of the pressure control valve 222, which is operated by the pressure of the air stored in the air tank 230, is connected to the signal line 224, such that the air pressure (e.g., the atmospheric pressure) lower than the third reference value may be measured by the pressure sensor 250. Further, when the pressure of the air stored in the air tank 230 is higher than the third reference value, a second line 222b of the pressure control valve 222, which is operated by the pressure of the air stored in the air tank 230, is connected to the supply line 223 and the signal line 224, such that the air pressure (e.g., the pressure of the air stored in the air tank 230) higher than the third reference value may be measured by the pressure sensor 250.

In particular, as illustrated in FIG. 5, only with the simple change in structure by additionally providing the measurement line 221 in the decompression valve 226 of the air pressure regulator 220 and attaching the pressure sensor 250 to the measurement line 221, the pressure of the air stored in the air tank 230 may be measured, and whether to operate the air compressor 210 may be controlled based on the pressure of the air, such that with the minimum change in structure, it is possible to more effectively prevent a loss of power caused by operating the air compressor 210 at all times, and to appropriately prevent difficulty in performing work which is caused by a lack of power resulting from unnecessary consumption of power.

Figure 6:
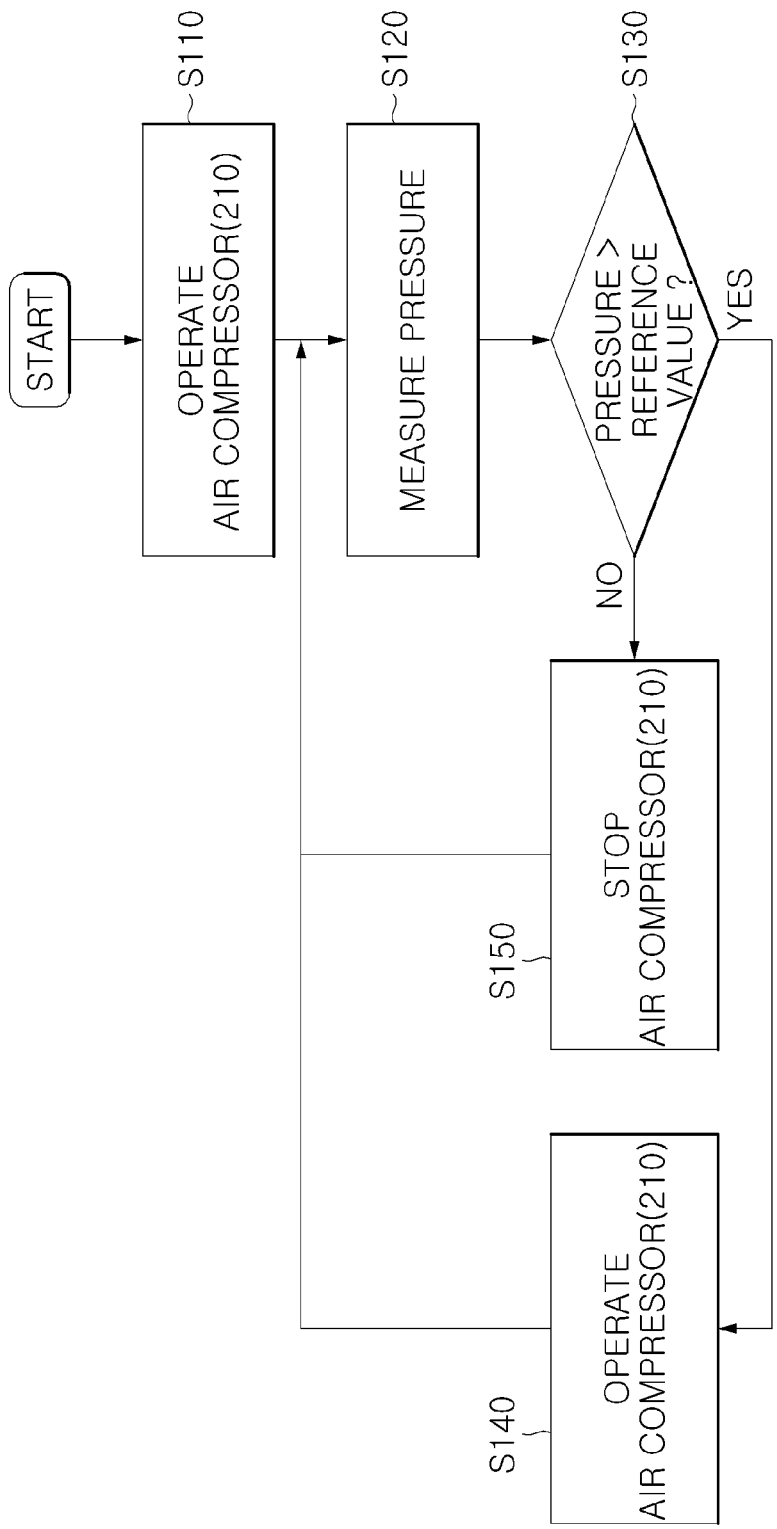
FIG. 6 is a flowchart for explaining an operation of the air supply device 200 of the agricultural work vehicle 1 according to the exemplary embodiment of the present disclosure.

Lastly, FIG. 6 illustrates a flowchart for explaining the operation of the air supply device 200 of the agricultural work vehicle 1 according to the exemplary embodiment of the present disclosure. Hereinafter, the operation of the air supply device 200 of the agricultural work vehicle 1 according to the exemplary embodiment of the present disclosure will be described in more detail with reference to FIG. 6.

First, when the operator starts the agricultural work vehicle 1 such as a tractor, the engine 2 operates, and the air compressor 210 operates (S110).

Next, the pressure sensor 250 is pressed by the air compressor 210 and measures the pressure of the air stored in the air tank 230 or the atmospheric pressure (S120). In addition, the pressure sensor 250 transmits the measured air pressure data to the controller 260.

Therefore, the controller 260 determines whether the pressure of the air stored in the air tank 230 or the atmospheric pressure, which is measured by the pressure sensor 250, exceeds the first reference value (S130).

In this case, when the measured pressure of the air exceeds the first reference value, which means a state in which the air with sufficient pressure is stored in the air tank 230, the controller 260 stops the operation of the air compressor 210 (S140).

In contrast, when the measured pressure of the air cannot reach the first reference value, which means a state in which the pressure of the air stored in the air tank 230 cannot reach the pressure required to brake the trailer 5, the controller 260 maintains the operation of the air compressor 210 (S150).

If the measured pressure of the air exceeds the first reference value in step S130 and the operation of the air compressor 210 is stopped in step S140, the pressure of the air stored in the air tank 230 is decreased over time due to a leakage of the air stored in the air tank 230, such that when the pressure of the air stored in the air tank 230, which is measured by the pressure sensor 250 (S120), cannot reach the first reference value (S130), the controller 260 operates the air compressor 210 by using the control signal (S150).

Therefore, the pressure of the air stored in the air tank 230 increases again, and the air compressor 210 operates again for a predetermined period of time, such that when the pressure of the air stored in the air tank 230 exceeds the first reference value, the controller 260 stops the operation of the air compressor 210 again, thereby preventing an unnecessary loss of power.

Therefore, the agricultural work vehicle 1 having the air supply device 200 according to the exemplary embodiment of the present disclosure controls whether to operate the air compressor 210 consistently by measuring the pressure of the stored air when compressing and storing the air into the air tank 230 in order to perform air braking on the trailer 5 attached to the rear side of the agricultural work vehicle 1, thereby effectively preventing a loss of power caused by operating the air compressor 210 at all times, and preventing the operational performance from deteriorating due to a lack of power caused by unnecessary consumption of power.

The above description is simply given for illustratively describing the technical spirit of the present disclosure, and those skilled in the art to which the present disclosure pertains will appreciate that various modifications, changes, and substitutions are possible without departing from the essential characteristic of the present disclosure. Accordingly, the exemplary embodiments disclosed in the present disclosure and the accompanying drawings are intended not to limit but to describe the technical spirit of the present disclosure, and the scope of the technical spirit of the present disclosure is not limited by the exemplary embodiments and the accompanying drawings. The protective scope of the present disclosure should be construed based on the following claims, and all the technical spirit in the equivalent scope thereto should be construed as falling within the scope of the present disclosure.

The invention claimed is:

1. An agricultural work vehicle having an air supply device comprising:
   an air compressor configured to compress air;
   an air tank configured to store the air compressed by the air compressor;
   a pressure sensor configured to measure a pressure of the air stored in the air tank or measure atmospheric pressure;
   a controller configured to stop an operation of the air compressor when the measured pressure exceeds a first reference value; and
   an air pressure regulator configured to decompress air in an air pressure circuit system by discharging the air to the outside when the pressure of the air stored in the air tank exceeds a second reference value,
   wherein the air pressure regulator comprises a decompression valve configured to reduce a pressure in the air pressure circuit system, the air pressure regulator has a measurement line provided at a point of the decompression valve at which the pressure of the air stored in the air tank is measured,
   wherein the air pressure regulator comprises a pressure control valve, and the pressure control valve changes connection paths based on the pressure of the air stored in the air tank to allow the pressure sensor to measure the pressure of the air stored in the air tank or measure the atmospheric pressure.

2. The agricultural work vehicle having the air supply device of claim 1, wherein the pressure sensor is connected to the measurement line to measure the pressure of the air transmitted through the pressure control valve.

3. The agricultural work vehicle having the air supply device of claim 1, wherein the air compressor has an electrically-controlled clutch controlled based on an electrical signal, and whether to operate the air compressor is controlled based on an electrical control signal of the controller.

4. The agricultural work vehicle having the air supply device of claim 1, wherein when an engine of the agricultural work vehicle operates, the air compressor operates, and pressures, which are measured by the pressure sensor at time intervals, are compared with the first reference value,
   wherein the air compressor is stopped when the measured pressure exceeds the first reference value, and
   wherein the air compressor operates when the measured pressure does not reach the first reference value.

5. The agricultural work vehicle having the air supply device of claim 1, wherein the decompression valve reduces pressure in the air pressure circuit system by connecting the air pressure circuit system to a discharge line based on the pressure of the compressed air compressed by the air compressor and on the pressure in the air tank transmitted through a signal line.

6. The agricultural work vehicle having the air supply device of claim 1, wherein the pressure control valve connects a signal line and a supply line based on the pressure in the air tank to transmit the pressure in the air tank to the signal line, or the pressure control valve connects the signal line and a drain line to transmit the atmospheric pressure to the signal line.

* * * * *